Dec. 27, 1932.                K. BERGSKAUG                 1,892,377
                               STUFFING BOX
                            Filed Oct. 15, 1930

INVENTOR.
Karl Bergskaug.
BY Duell, Dunn & Anderson.
ATTORNEYS.

Patented Dec. 27, 1932

1,892,377

UNITED STATES PATENT OFFICE

KARL BERGSKAUG, OF BROOKLYN, NEW YORK

STUFFING BOX

Application filed October 15, 1930. Serial No. 488,703.

This invention relates to a functionally and structurally improved stuffing box capable of use in numerous different associations, but primarily intended for employment with condensers and similar apparatus.

It is an object of the invention to provide a structure of this nature and with which packing may be associated in such manner that leakage will be practically eliminated and the necessity of repacking will be reduced to a minimum.

A further object is that of constructing a stuffing box which will stand up under extreme conditions of temperature variation and pressures, and will prevent effectually the escape of fluid under these circumstances and in which moreover when it is desirable—after a certain amount of use—to tighten the packing, this may be accomplished with the expenditure of minimum effort and time.

Another object is that of providing a device of this nature which will embody a simple and rugged construction operating for indefinite periods of time with freedom from difficulties, and which, moreover may be provided at minimum cost in addition to the fact that initial and subsequent packing operations may be achieved without the use of especially skilled labor or a great amount of time.

Figure 1:
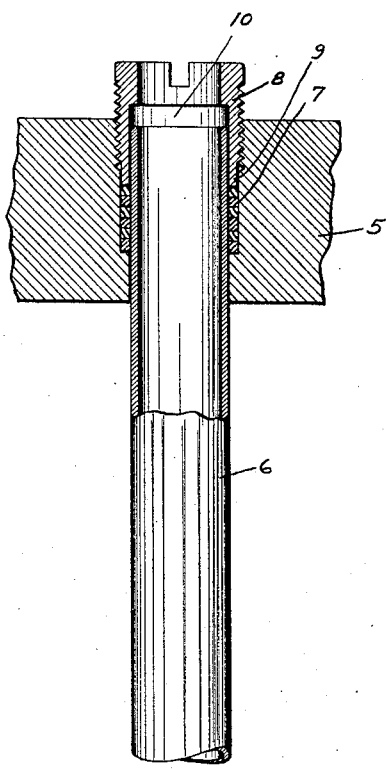
Figure 2:
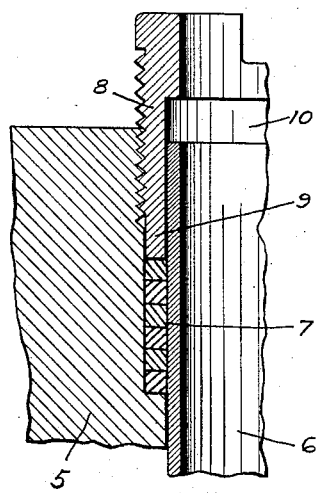

With these and other objects in mind, reference is had to the attached sheet of drawing illustrating one practical embodiment of the invention, and in which:

Fig. 1 is a sectional view of one form of stuffing box constructed within the terms of the present invention; and Fig. 2 is an enlarged fragmentary view of this structure.

In these views, the numeral 5 indicates the end plate or tube sheet of a condenser and which is formed with a series of transverse bores for accommodating the ends of tube 6. While, of course, special tube mounting members might be provided, it is in most respects desirable to incorporate the hereinafter described structure directly within or in association with the plate 5 instead of having the same form a part of an especial interposed mounting member.

Thus, it will be observed that the bores (one only of which has been illustrated) formed in the plate include preferably an inner reduced portion having a diameter such that it snugly accommodates the end of the tube 6. The bore is extended and enlarged beyond its inner end to provide a space such that the walls of the tube will be out of contact with the face of this space. In turn, beyond this point the bore is preferably screw threaded.

In using the invention, the tubes are positioned with their ends within the bores and by means of a suitable implement, a packing substance which may be in the nature of a coiled strip 7 is interposed between the extended portions of the bore and the outer face of the tube. This packing amply fills the space to prevent the escape of fluid past the same, but it is, moreover, contemplated by the present invention that a plug 8 be mounted by the screw threads at the outer end of the bore, and have an unthreaded inwardly extending skirt portion 9 which bears against the inner face of the packing, and serves when the plug is screwed home to compress the packing to a point at which there can be substantially no escape of fluid even in the event that the parts are subjected to pressure far beyond those which they are normally called upon to sustain. It is obvious that by screwing the plug 8 down, the pressure to which the packing is subjected is increased to such an extent that this packing is forced into intimate contact with the faces of the bore and tube, and especially provides seals adjacent the shoulder defining the inner end of the enlarged bore portion and also the inner edge of the plug skirt 9.

As a result of this construction, it is unnecessary in packing a condenser to apply the packing material within a screw thread bore portion. Consequently, the packing is not "chewed". Moreover, it will be noted that the plug provides ample space 10 between the inner end of the tube and its inner face. Consequently, the tube is free to expand and retract under variable temperature conditions without this movement in any way effecting a mutilation of the packing. More especially, such contraction and expansion will result merely in a sliding contact between the packing and tube without the packing being subjected to any wedging or destructive action.

Under these circumstances, it will be obvious that the packing will stand up indefinitely except for normal internal deterioration—if any—. When it becomes necessary to tighten the packing, this may be done simply by tightening the plugs and if finally it does become necessary to renew the packing, this may be accomplished readily by simply withdrawing the packing after removing the plugs and recoiling or otherwise placing in position new packing material.

By means of the present invention, it is also unnecessary to thread throughout their entire length the bores of the tube sheet, thus reducing materially the cost of manufacture. Also, in view of the fact that the faces between which the packing is disposed are not screw threaded, the fluid cannot seep along any screw threads as has been the case in the past. Moreover, it is unnecessary in condenser and similar work to roll over the ends of the tubes as has been previously attempted in order to overcome difficulties in this connection. Incidently, where such a construction has been resorted to at one tube end, the movement at the opposite tube end has, of course, been increased which has resulted in the packing more quickly being rendered useless. Finally, due to the fact that the packing is tightened and maintained in sealing contact by the plug or ferrule 8, it will be found that it will under usual circumstances never be necessary to rethread the tube sheet of the condenser or similar apparatus.

From the foregoing, it will be understood that among others the several objects of the invention as specifically aforementioned are achieved. It will be appreciated that numerous changes in construction and rearrangements of the parts might be resorted to without departing from the spirit of the invention as defined by the claims.

Having described my invention, what I claim as new and desire to secure by Letters Patent, is:

1. A stuffing box for tubes including, in combination, a tube sheet formed with a bore extending through the same, said bore comprising two unequal diameters, a shoulder formed in said bore and defining the boundary between those portions of the bore presenting greater and lesser diameters, smooth side walls in said bore in the section of greatest diameter and adjacent said shoulder, the remainder of said section of greatest diameter being screw threaded, a tube slidable within said bore and of a diameter substantially that of said bore section of lesser diameter whereby an annular space is provided between said tube and said smooth bore in the section of greatest diameter of the latter, a wound strip packing inserted in said annular space and against the smooth walls and of a width no greater than the smooth portion of the walls and adapted to fill the same and a screw threaded ferrule for cooperation with the screw threads in said bore, said ferrule being formed with a smooth outer wall adjacent the leading edge thereof for slidable contact with the smooth side walls of said bore of greatest diameter, said leading edge adapted to engage said packing to compress the same in the space between the tube and the smooth bore and beyond said screw threaded portion, while the opposite end of the ferrule projects outside the outer face of the tube sheet.

2. A stuffing box comprising a tube sheet formed with an aperture, said aperture defining two bores of substantially different diameter, a shoulder in said aperture defining the boundary between said bores, smooth side walls in the larger of said bores adjacent said shoulder, a tube of substantially the same diameter as the smaller of said bores and adapted to be positioned within said aperture whereby an annular opening is formed between the side walls of said larger bore and said tube at said smooth walls, a non-metallic wound packing of a width no greater than the smooth portion of the walls adapted to set upon said shoulder and substantially fill said annular opening opposite said smooth walls, a ferrule, a smooth surfaced band forming the leading edge thereof, said band being of substantially the same diameter as the larger of said bores and in contact with said smooth walls and means carried by said ferrule and said aperture whereby said leading edge engages said packing to compress the same between said smooth walls and said tube.

In testimony whereof I affix my signature.

KARL BERGSKAUG.